United States Patent
Takai (10) Patent No.: US 9,667,623 B2
(45) Date of Patent: May 30, 2017

(54) AUTHENTICATION APPARATUS THAT ASSISTS INPUT OF USER ID AND PASSWORD AUTHENTICATION METHOD, AND RECORDING MEDIUM

(71) Applicant: Kyocera Document Solutions Inc., Osaka (JP)

(72) Inventor: Kenji Takai, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 71 days.

(21) Appl. No.: 14/952,933

(22) Filed: Nov. 26, 2015

(65) Prior Publication Data

US 2016/0149895 A1 May 26, 2016

(30) Foreign Application Priority Data

Nov. 26, 2014 (JP) ................. 2014-238369

(51) Int. Cl.
| | |
|---|---|
| *H04L 9/00* | (2006.01) |
| *H04L 29/06* | (2006.01) |
| *G06F 21/31* | (2013.01) |
| *G06F 21/45* | (2013.01) |
| *G06F 21/60* | (2013.01) |

(52) U.S. Cl.
CPC ............ *H04L 63/083* (2013.01); *G06F 21/31* (2013.01); *G06F 21/45* (2013.01); *G06F 21/608* (2013.01); *H04L 63/12* (2013.01)

(58) Field of Classification Search
CPC ....... H04L 63/12; H04L 63/083; G06F 21/31; G06F 21/45; G06F 21/608
See application file for complete search history.

(56) References Cited

U.S. PATENT DOCUMENTS

| | | | | |
|---|---|---|---|---|
| 6,592,032 B1 * | 7/2003 | Takaragi | ................. | G06F 21/62 235/375 |
| 8,448,225 B2 * | 5/2013 | Kijima | ................... | G06F 21/31 713/170 |
| 9,077,710 B1 * | 7/2015 | Levner | ................. | H04L 63/083 |
| 9,514,294 B1 * | 12/2016 | Hepburn | ............... | G06F 21/316 |

(Continued)

FOREIGN PATENT DOCUMENTS

| | | |
|---|---|---|
| JP | 06-052112 A | 2/1994 |
| JP | 06-177872 A | 6/1994 |

(Continued)

*Primary Examiner* — Beemnet Dada
(74) *Attorney, Agent, or Firm* — James Judge (57) ABSTRACT

An authentication apparatus includes an authentication determination circuit, a partial determination circuit, and a combination determination circuit. The partial determination circuit determines whether or not any one of a first set or a second set exists. The first set is a set where only the input user ID matches the registered user ID. The second set is a set where only the input password matches the registered password. The combination determination circuit generates a new set by combining the input user ID of the existing first set and the input password of another set or a similar method. The authentication determination circuit executes a user authentication if, among the generated sets, the input user ID matches the registered user ID, and the input password matches the registered password.

8 Claims, 9 Drawing Sheets

(56) References Cited

U.S. PATENT DOCUMENTS

2008/0201775 A1* 8/2008 Kai .................. G06F 21/629
726/19
2014/0208386 A1* 7/2014 Sama .................. H04L 63/08
726/4

FOREIGN PATENT DOCUMENTS

| JP | 06-243099 A | 9/1994 |
| JP | 2011-227762 A | 11/2011 |

* cited by examiner

Registered User Name    piyopiyo
Registered Password    hoge@@@1234   ← 405
Account Lock Threshold Value   Five times

| Number of times | First Time | Second Time | Third Time | Fourth Time | Fifth Time |
|---|---|---|---|---|---|
| Input User ID | piyopiyo | piyopiyo | piyopiyo | piyochiko | piyohiko |
| Input Password | hogehoge1234 | hogehoge7890 | hoge@@@7890 | hoge@@@7890 | hoge@@@1234 |

406 — Number of times row
407 — Input User ID and Input Password rows
501 — First, Second, Third Time
502 — Fourth Time
503 — Fifth Time

AUTHENTICATION APPARATUS THAT ASSISTS INPUT OF USER ID AND PASSWORD AUTHENTICATION METHOD, AND RECORDING MEDIUM

INCORPORATION BY REFERENCE

This application is based upon, and claims the benefit of priority from, corresponding Japanese Patent Application No. 2014-238369 filed in the Japan Patent Office on Nov. 26, 2014, the entire contents of which are incorporated herein by reference.

BACKGROUND

Unless otherwise indicated herein, the description in this section is not prior art to the claims in this application and is not admitted to be prior art by inclusion in this section.

In recent years, with increasing awareness against security, use of an electronic device (information equipment) such as an image forming apparatus requires respective users to enter a user ID (user name) and password as user authentication. Such user authentication is executed by the respective electronic devices, and thus a user is required to remember as many user IDs and passwords as the number of the electronic devices.

On the other hand, password policy requires the number of characters (length) and character types (complexity such as a combination of alphabets and numerals) for the password in the user authentication, and thus a user is currently unable to set a simple password. Accordingly, this generates a situation where the user forgets the user ID and/or the password.

When the user forgets the user ID and/or the password, the user attempts to enter the user IDs and passwords multiple times to the electronic device within a range that the user remembers the user IDs and passwords. On the other hand, when the wrong user IDs or passwords are entered multiple times, the electronic device temporarily blocks (locks) information input by an account lock function. Then, the user is required to wait in front of the electronic device until the account lock is released, and thus this causes a problem that the user occupies this electronic device. Additionally, occupying the electronic device for a long period of time by the user causes a problem that a third person assumes that the user is performing unauthorized access.

With regard to such problems, there is disclosed a technique that provides a user who forgets a password with a hint for the user to remember this password.

SUMMARY

An authentication apparatus according to one aspect of the disclosure includes an authentication determination circuit, a partial determination circuit, and a combination determination circuit. The authentication determination circuit determines whether or not an input user ID entered by a user matches a registered user ID, and an input password entered by the user matches a registered password. The partial determination circuit determines whether or not any one of a first set or a second set exists among sets of the input user IDs and the input passwords having been entered hitherto when the entered input user ID does not match the registered user ID or the entered input password does not match the registered password, the first set being a set where only the input user ID matches the registered user ID, the second set being a set where only the input password matches the registered password. The combination determination circuit generates a new set, when the first set or the second set exists, by combining the input user ID of the existing first set and the input password of another set, or by combining the input password of the existing second set and the input user ID of another set, and determining whether or not the input user ID matches the registered user ID and the input password matches the registered password, among the generated sets. The authentication determination circuit executes a user authentication if, among the generated sets, the input user ID matches the registered user ID, and the input password matches the registered password.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of an authentication apparatus and an authentication method of the disclosure for ease of understanding the disclosure, with reference to the attached drawings. The following embodiment is merely an exemplary embodiment according to the disclosure and not intended to limit the technical scope of the disclosure. Additionally, an alphabet S attached before a numeral in the flowchart mean a step.

The following describes a terminal device with an authentication apparatus (authentication unit), and an image processing apparatus that can communicate with this terminal device via wireless or wired communication, as one example of the embodiments of the disclosure. As the terminal device, for example, a mobile phone, a PDA, a notebook type terminal device, a tablet type terminal device, or similar device can be employed. As the image processing apparatus, for example, the following can be employed: a multifunctional peripheral (MFP) with functions such as a facsimile, a copier, a scanner, and a printer; a copier; a printer; and similar device.

Figure 1:
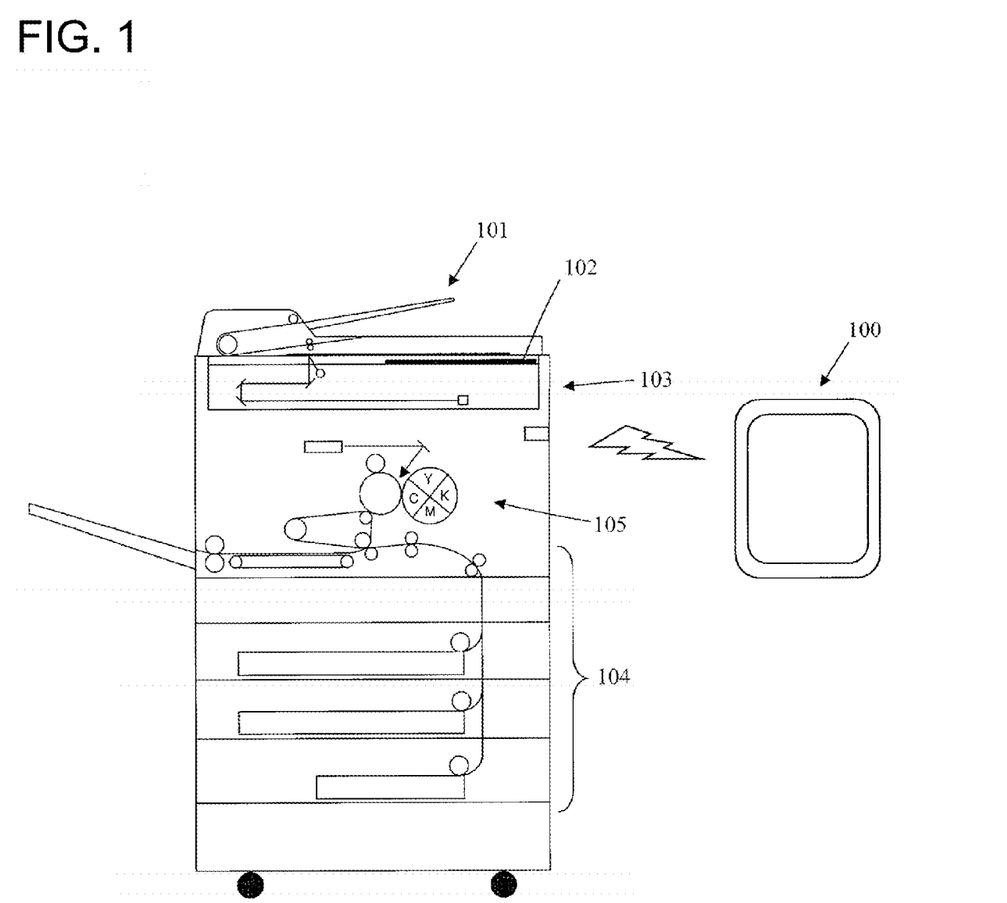
FIG. 1 conceptually illustrates a terminal device (an authentication apparatus) and an overall configuration of an image processing apparatus according to one embodiment of the disclosure.

A terminal device 100 is, as illustrated in FIG. 1, communicatively connected to an adjacent image processing apparatus 101. Upon connection of the terminal device 100 to the image processing apparatus 101, a user can input an instruction to the image processing apparatus 101 via the terminal device 100. The terminal device 100 functions as the authentication apparatus. For example, when the terminal device 100 starts communication with the image processing apparatus 101, the terminal device 100 obtains data for authentication that this image processing apparatus 101 has and performs user authentication instead of this image processing apparatus 101.

The image processing apparatus 101 accepts a setting condition of a predetermined job from a user via the terminal device 100 or an operation unit 102. The job is the job configured of any one of or a combination of, for example, a copy function, a facsimile function, a scan function, and a print function.

When the image processing apparatus 101 accepts the setting condition of the job, the image processing apparatus 101 executes this job by driving respective units such as an image reading unit 103, a conveying unit 104, and an image forming unit 105. The image reading unit 103 reads image data placed on a platen or an automatic document feeding unit. The conveying unit 104 conveys a paper sheet to the image forming unit 105 from a sheet feed cassette or a manual bypass tray. The image forming unit 105 executes image formation by transferring a toner image corresponding to the image data to the conveyed paper sheet and fixing the toner image with a fixing roller.

Control circuits of the terminal device 100 and image processing apparatus 101, though not illustrated, connect a central processing unit (CPU), a read only memory (ROM), a random access memory (RAM), a hard disk drive (HDD), a solid state drive (SSD), and drivers corresponding to respective driving units by an internal bus.

The functions of the CPUs of the terminal device 100 and image processing apparatus 101 are, for example, as follows: executing programs stored in the ROM, the HDD, the SSD, or similar device by using the RAM as a work area; receiving and transmitting data, instructions, signals, commands, and similar information from the drivers based on this execution result; controlling operations of the respective driving unit regarding the execution of the job. In regards to respective units (illustrated in FIG. 2) that will be described below other than the driving units, the CPUs also ensures these respective units by executing the respective programs. The ROM, RAM, HDD, SSD, and similar device store the programs and data that ensure these respective units described below.

Figure 2:
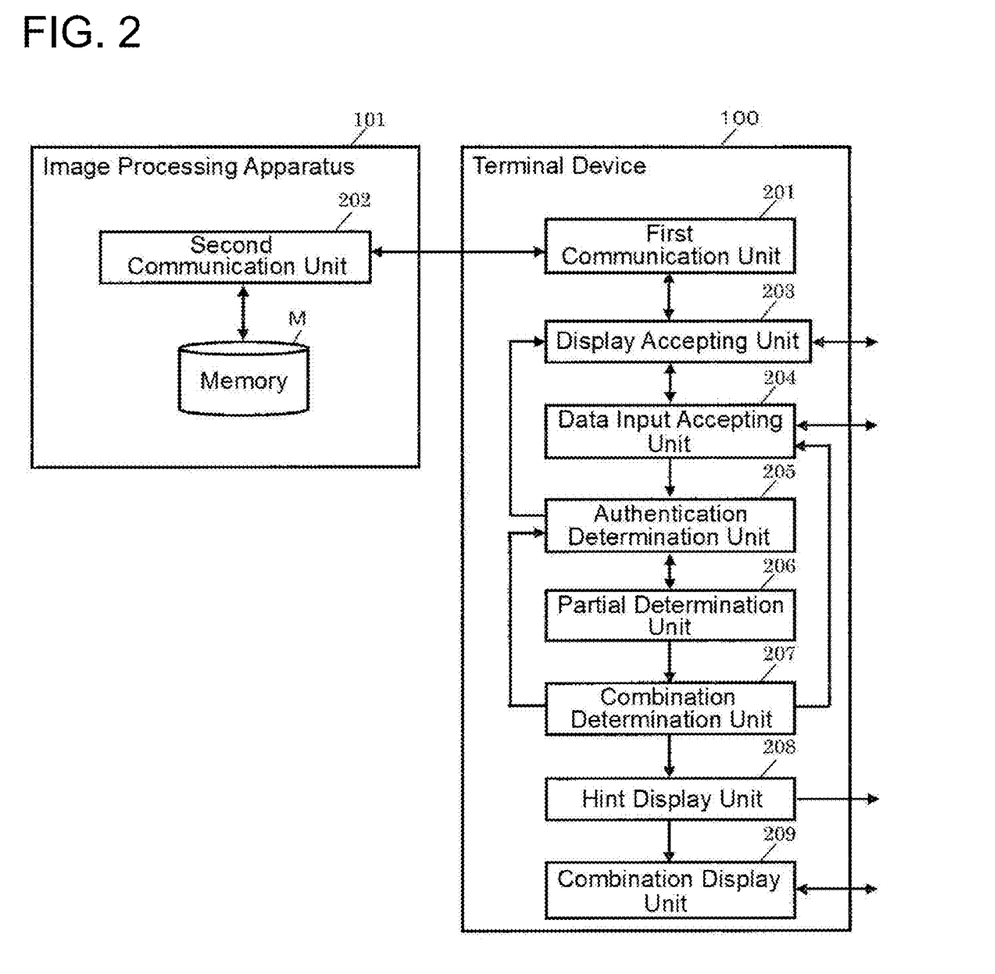
FIG. 2 illustrates a terminal device and an image processing apparatus according to the one embodiment.

Next, with reference to FIGS. 2 and 3, a description will be given of a configuration and an execution procedure according to the embodiment of the disclosure. First, when a user having the terminal device 100 approaches to proximity of the image processing apparatus 101, a first communication unit 201 of this terminal device 100 starts wireless communication with a second communication unit 202 of this image processing apparatus 101, and this terminal device 100 is connected to this image processing apparatus 101. In this state, the user can transmit predetermined instructions to the image processing apparatus 101 via the terminal device 100 and receive predetermined information from this image processing apparatus 101.

Here, when the user operates a display accepting unit 203 (for example, a touch panel) of the terminal device 100, accesses the image processing apparatus 101, and selects an authentication key relative to this image processing apparatus 101, the display accepting unit 203 of this terminal device 100 notifies a data-input accepting unit 204 of the selection. The data-input accepting unit 204, which has received this notice, obtains data for authentication from this image processing apparatus 101 (for example, a memory M) and causes an authentication screen 400 to be displayed on the touch panel (FIG. 3: S101).

Figure 4A:
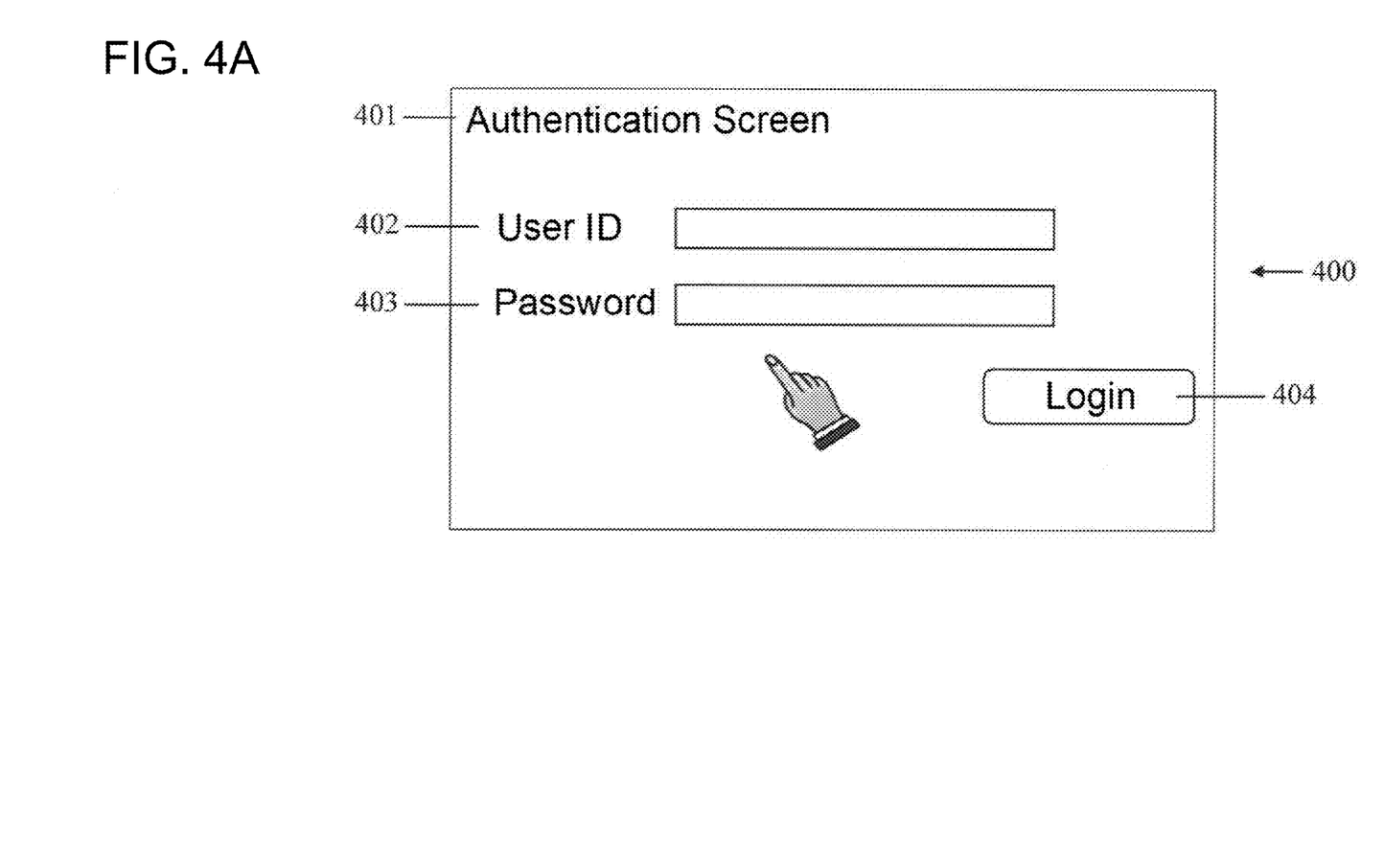
FIG. 4A illustrates an exemplary authentication screen according to the one embodiment.

As illustrated in FIG. 4A, the authentication screen 400 displays the following: a message 401 indicative of the authentication screen; an entry field 402 for a user ID (for example, a user name): an entry field 403 for a password; and a login key 404. Predetermined characters, symbols, numerals, and similar data are entered by keyboard keys (not illustrated) in the entry field 402 for a user ID and the entry field 403 for a password.

While viewing the authentication screen 400, the user, first, enters a user ID (for example, "piyopiyo") and a password (for example, "hogehoge1234") to the terminal device 100 via the touch panel and selects the login key 404. Then, the data-input accepting unit 204 accepts the input of the user ID and password (FIG. 3: S102) and notifies an authentication determination unit 205 (which is also referred to as an authentication determination circuit) of the acceptance. The authentication determination unit 205, which has received this notice, obtains a preliminarily registered user ID (for example, "piyopiyo"), a preliminarily registered password (for example, "hoge@@@@1234"), and an account lock threshold value (for example, "five times"), from the image processing apparatus 101. Then, the authentication determination unit 205 determines whether or not the entered input user ID matches the registered user ID and the entered input password matches the registered password (FIG. 3: S103).

Figure 3:
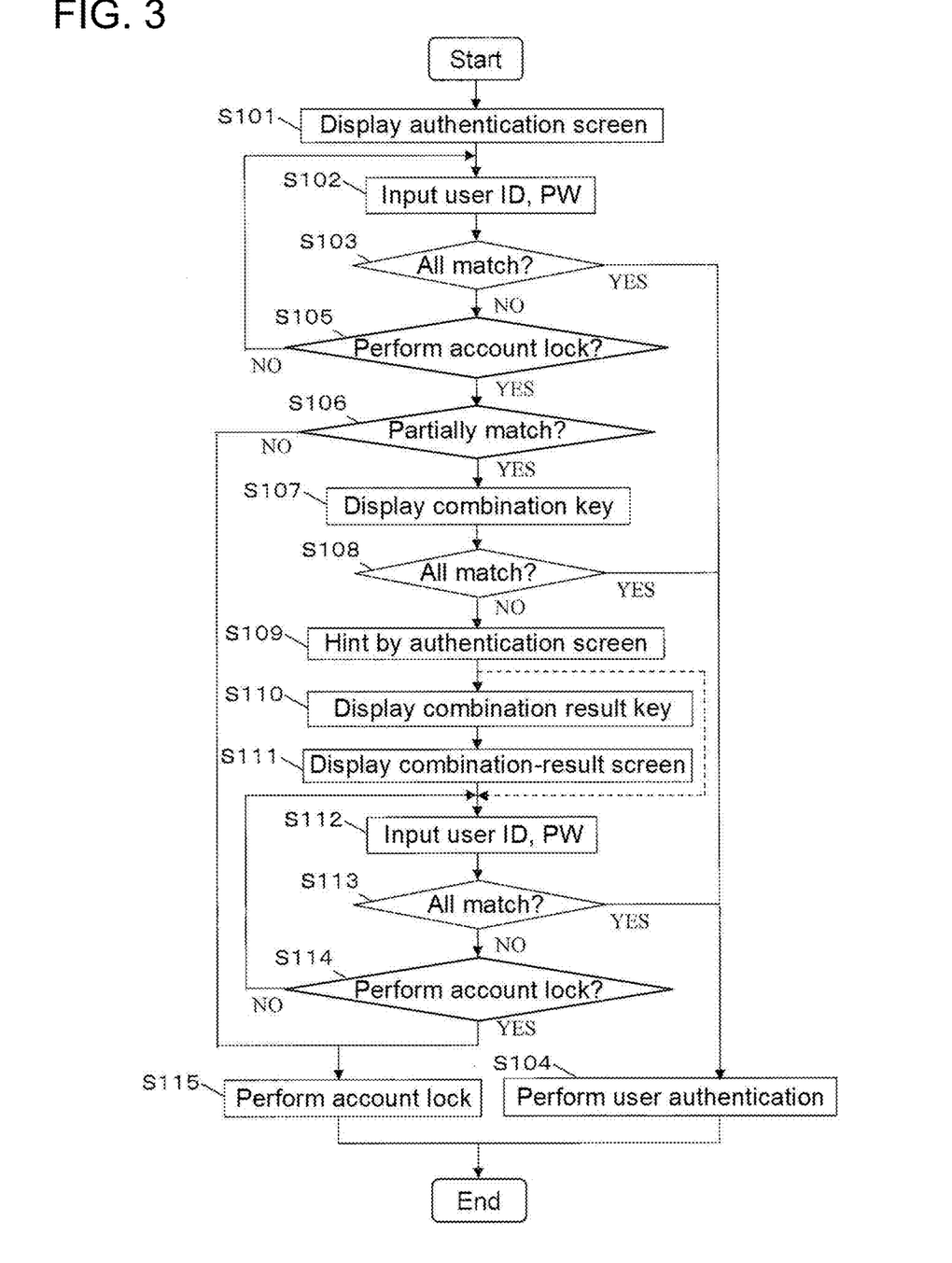
FIG. 3 illustrates an execution procedure according to the one embodiment.

When a result of the determination is that the input user ID matches the registered user ID and the input password matches the registered password (FIG. 3: YES at S103), the authentication determination unit 205 executes the user authentication and permits use of the image processing apparatus 101 by the user (FIG. 3: S104). This corresponds to a case that the user accurately remembers the correct user ID and password.

Figure 4B:
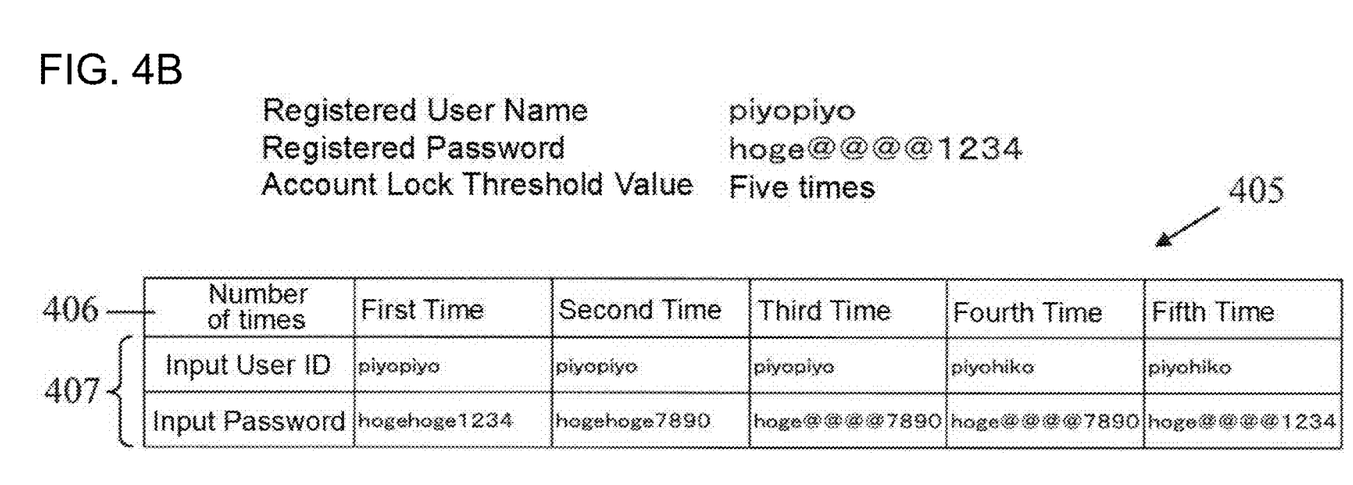
FIG. 4B illustrates an exemplary table according to the one embodiment.

On the other hand, at S103, when the result of the determination is that the entered input user ID does not match the registered user ID or the entered input password does not match the registered password (FIG. 3: NO at S103), the authentication determination unit 205 determines that the user authentication is failed. Then, as illustrated in FIG. 4B, the authentication determination unit 205 causes a table 405 of a predetermined memory to temporarily store a count 406 (for example, "first time") where the input user IDs and the input passwords are entered, and sets 407 of these input user IDs and input passwords by associating the count 406 and the sets 407. Then, the authentication determination unit 205 counts a failure count indicative of the number of times of the failure of this user authentication by only one time from an initial value ("zero times") and determines whether or not this failure count matches the account lock threshold value (FIG. 3: S105).

When the result of the determination is that the failure count does not match the account lock threshold value (FIG. 3: NO at S105), the authentication determination unit 205 determines that input of new user ID and password from the user can be still accepted and notifies the data-input accepting unit 204 of the determination. The data-input accepting unit 204, which has received this notice, returns to S101, causes the authentication screen 400 to be displayed, and accepts new input user ID and input password (FIG. 3: S101).

Here, if the user enters a new input user ID and input password, at the failure count less than the account lock threshold value, and then the input user ID matches the registered user ID and the input password matches the registered password, the operation moves to S104, and the user authentication is executed (FIG. 3: S104).

On the other hand, a description will be given bellow of a case where the user forgets the correct input user ID and input password, and, although the user enters new input user IDs and input passwords as many as the failure count that corresponds to the account lock threshold value, the input user IDs do not match the registered user ID, or the input passwords do not match the registered password.

For example, assume that the user enters the set of the input user ID ("piyopiyo") and input password ("hogehoge1234") for the first time, enters the set of the input user ID ("piyopiyo") and input password ("hogehoge7890") for the second time, enters the set of the input user ID ("piyopiyo") and input password ("hoge@@@@7890") for the third time, enters the set of the input user ID ("piyohiko") and input password ("hoge@@@@7890") for the fourth time, and enters the set of the input user ID ("piyohiko") and input password ("hoge@@@@1234") for the fifth time. Because these sets of the input user ID and input password do not match the set of the registered user ID and registered password (FIG. 3: NO at S103), the failure count becomes the account lock threshold value, and when this failure count matches the account lock threshold value (FIG. 3: YES at S105), the authentication determination unit 205 notifies a partial determination unit 206 (which is also referred to as a partial determination circuit) of this state. The partial determination unit 206, which has received this notice, determines whether or not any one of a first set where only the input user ID matches the registered user ID or a second set where only the input password matches the registered password exists (FIG. 3: S106), among the sets of the input user IDs and input passwords that have been entered hitherto.

Here, there is especially no limitation for the method where the partial determination unit 206 executes the determination. For example, the partial determination unit 206 refers to the table 405 and searches whether or not the first set where the input user ID only matches the registered user ID ("piyopiyo") exists, among the sets 407 of the input user IDs and input passwords stored in the table 405. Furthermore, the partial determination unit 206 searches whether or not the second set where the input password only matches the registered password ("hoge@@@@1234") exists, among the sets 407. In FIG. 4B, the input user ID from the first time to the third time matches the registered user ID ("piyopiyo"), and thus the partial determination unit 206 determines that the first set exists. Additionally, the input password of the fifth time matches the registered password ("hoge@@@@1234"), and thus the partial determination unit 206 determines that the second set exists.

As a result of the determination, when any one of the first set and the second set exists (FIG. 3: YES at S106), the partial determination unit 206 notifies a combination determination unit 207 (which is also referred to as a combination determination circuit) of the determination. The combination determination unit 207, which has received this notice, generates new sets by combining the input user ID of the existing first set and the input password of the other set, or the input password of the existing second set and the input user ID of the other set. Then the combination determination unit 207 determines whether or not the input user ID matches the registered user ID and the input password matches the registered password, among these generated sets.

Figure 5A:
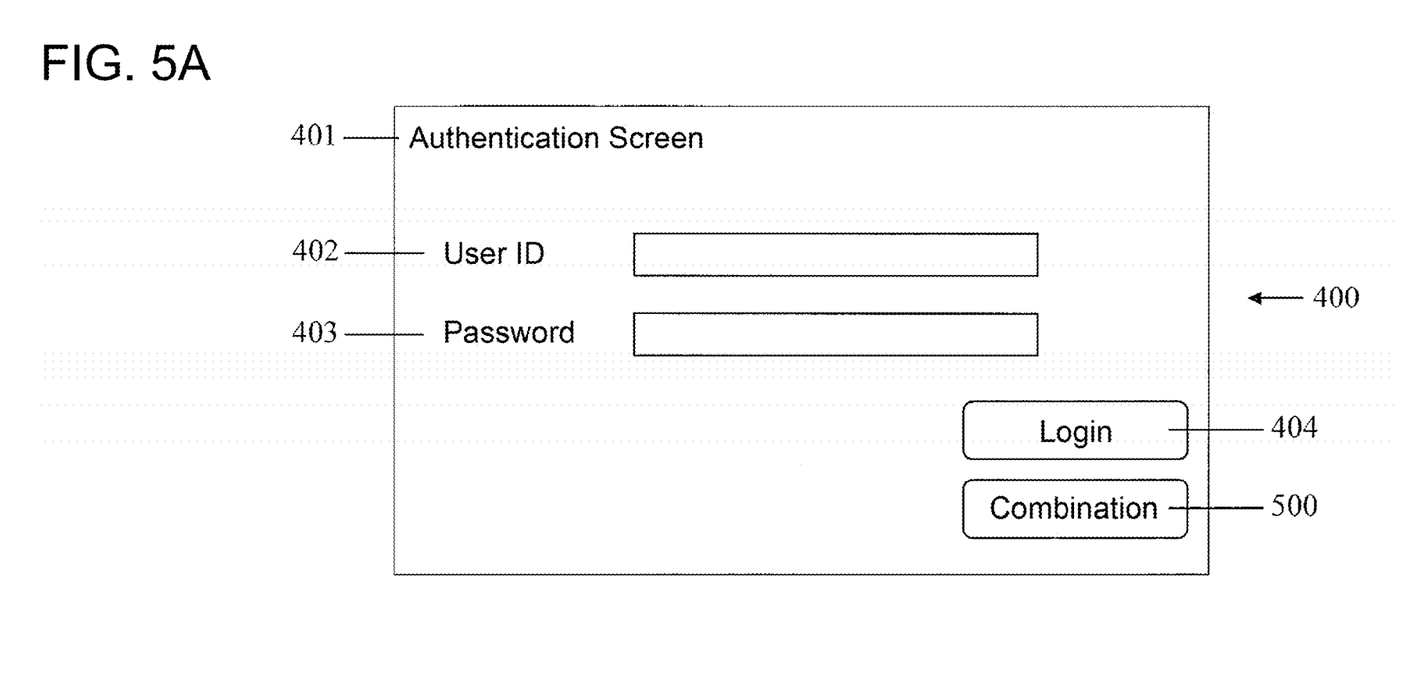
FIG. 5A illustrates an exemplary authentication screen according to the one embodiment.

Here, there is especially no limitation for the method where the combination determination unit 207 executes the determination. For example, first, as illustrated in FIG. 5A, the combination determination unit 207 causes the authentication screen 400 to selectably display a combination key 500 (FIG. 3: S107). When the user does not select the combination key 500, the combination determination unit 207 does nothing especially. When the user selects the combination key 500, the combination determination unit 207 generates the new sets by combining the input user ID of the existing first set and the input password of the other set, or the input password of the existing second set and the input user ID of the other set.

Figure 5B:
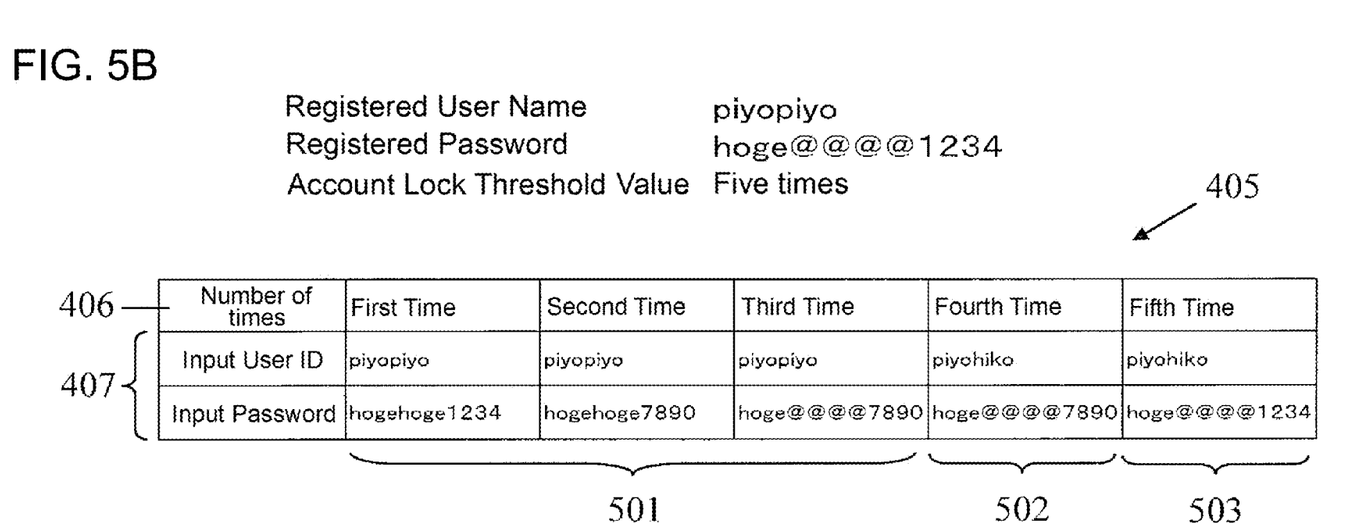
FIG. 5B illustrates the exemplary table according to the one embodiment.

As illustrated in FIG. 5B, when the first set exists, the combination determination unit 207 generates new sets by obtaining the input user ID of the first set (sets 501 from the first time to the third time) and the input passwords of the other sets (a set 502 of the fourth time, a set 503 of the fifth time) other than this first set.

Additionally, when the second set exists, the combination determination unit 207 generates new sets by obtaining the input password of the second set (the set 503 of the fifth time) and the input user IDs of the other sets (the sets 501 from the first time to the third time, the set 502 of the fourth time) other than this second set.

Further, when the first set and the second set exist, the combination determination unit 207 generates a new set by obtaining the input user ID of the first set (the sets 501 from the first time to the third time) and the input password of the second set (the set 503 of the fifth time). This obviously generates the correct set of the registered user ID and registered password.

Then, the combination determination unit 207 determines whether or not the input user ID matches the registered user ID and the input password matches the registered password, among the newly generated set (FIG. 3: S108).

The result of the determination that the input user ID matches the registered user ID and the input password matches the registered password (FIG. 3: YES at S108) corresponds to a case where the first set and the second set exist. In this case, the combination determination unit 207 notifies the authentication determination unit 205 of the result of the determination. The authentication determination unit 205, which has received this notice, executes the user authentication and permits the use of the image processing apparatus 101 by the user (FIG. 3: S104). This easily enables the user authentication to be executed even when the user does not accurately remember the registered user ID and registered password. That is, existence of a set with the correct user ID and a set with the correct password, among the repeatedly entered sets of the user IDs and input passwords, easily enables the user authentication to be executed. Especially, even when the user forgets the correct user ID and password and attempts multiple inputs of the user IDs and passwords, the user can cause the user authentication to be executed without being completely incapable of the operation, in accordance with contents of the input user IDs and input passwords.

On the other hand, as a result of the determination, when the input user ID does not match the registered user ID, or the input password does not match the registered password (FIG. 3: NO at S108), the combination determination unit 207 notifies the data-input accepting unit 204 and a hint display unit 208 (which is also referred to as a hint display circuit) of the result of the determination. The data-input accepting unit 204, which has received this notice, causes the authentication screen 400 to be displayed on the touch panel again. The hint display unit 208, which has received this notice, displays the matched input user ID or input password in an entered state with a mask display. Then, in the authentication screen 400, the notified hint display unit 208 displays character types that compose the corresponding registered user ID or registered password by each character, in an entry field of the unmatched input user ID or input password (FIG. 3: S109).

Figure 6A:
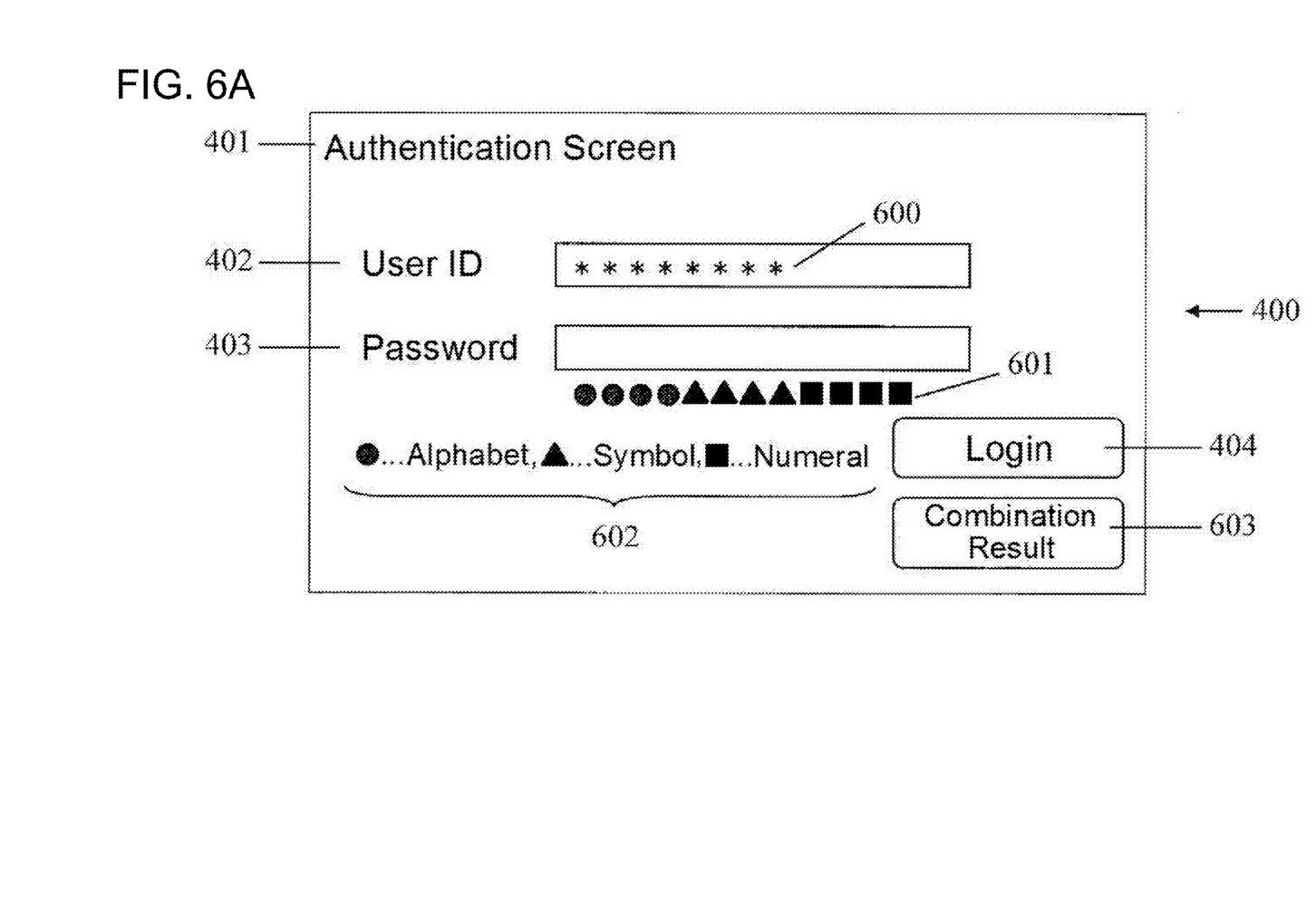
FIG. 6A illustrates an exemplary authentication screen according to the one embodiment.

Here, there is especially no limitation for the method where the hint display unit 208 displays. For example, when the input user ID matches the registered user ID ("piyopiyo"), and the input password does not match the registered password ("hoge@@@@1234"), as illustrated in FIG. 6A, the hint display unit 208 displays the matched user ID in an entered state with a mask display 600 of "*" in the entry field 402 for the user ID. Additionally, the hint display unit 208, among the characters composing the registered password ("hoge@@@@1234"), identifies respective character types (the alphabet, the symbol, the numeral), assigns symbols (for example, "●" for the alphabet, "▲" for the symbol, "■" for the numeral) indicative of these types to these identified character types, and generates a symbolic registered password 601 ("●●●●▲▲▲▲■■■■") that is composed of only the symbols. The hint display unit 208 displays the generated symbolic registered password 601 at the proximity of the entry field 403 of the unmatched input password. This enables to display the character types that compose the registered password by each character and to provide the user with awareness of a composition of the correct password. Further, this prevents the correct password from being known by a third person who peeps at the touch panel other than the user. Additionally, the hint display unit 208 may display a notation 602 indicative of character types at the proximity of the symbolic registered password 601.

When displaying the symbolic registered password 601, the hint display unit 208 notifies a combination display unit 209 (which is also referred to as a combination display circuit) of this display operation. The combination display unit 209, which has received this notice, displays all the sets of the input user IDs and input passwords that have been entered hitherto, and also displays the input user ID that matches the registered user ID, or the input password that matches the registered password, in a different display form from the other display form.

Here, there is especially no limitation for the method where the combination display unit 209 displays. For example, first, as illustrated in FIG. 6A, the combination display unit 209 causes the authentication screen 400 to display a combination result key 603 selectably (FIG. 3: S110). When the user does not select the combination result key 603, the combination display unit 209 does nothing especially. when the user selects the combination result key 603, the combination display unit 209 causes a combination-result screen 604 to be displayed on the touch panel (FIG. 3: S111).

Figure 6B:
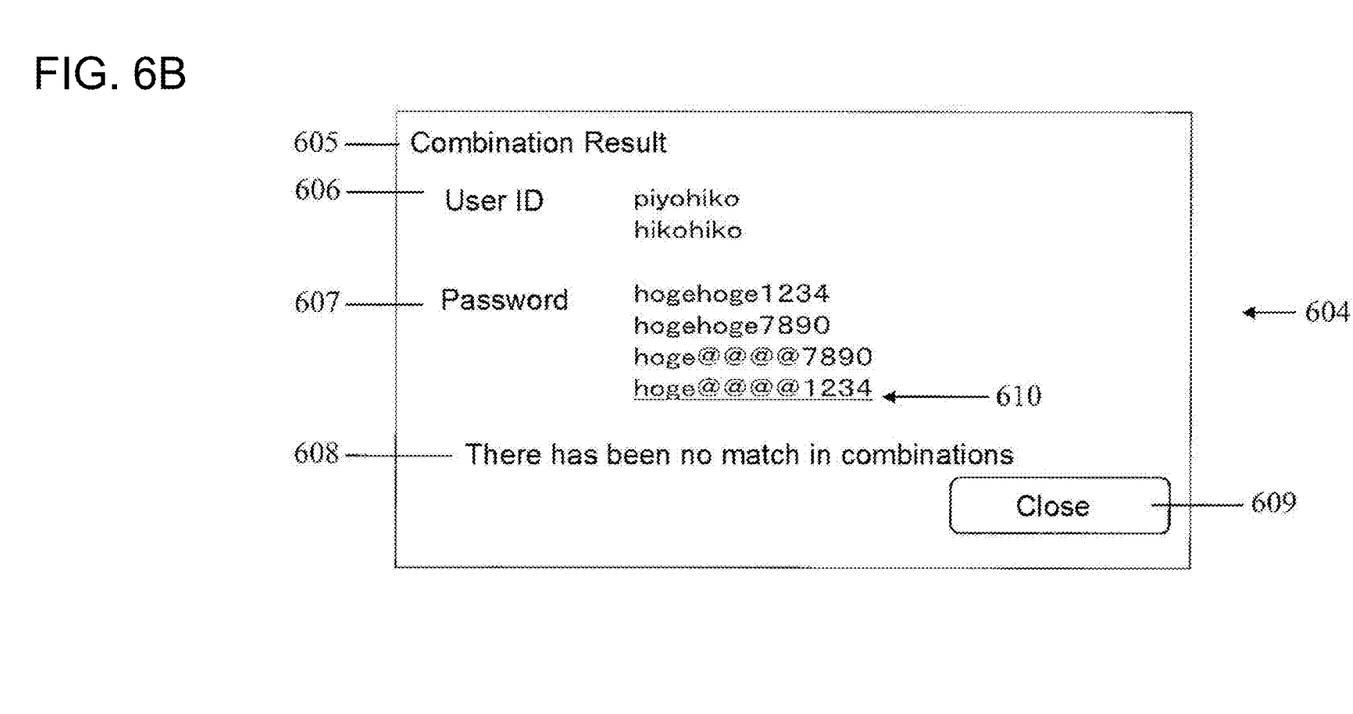
FIG. 6B illustrates an exemplary combination-result screen according to the one embodiment.

The combination-result screen 604 displays the following: a message 605 of the combination result; all the input user IDs 606 having been entered hitherto; all the input passwords 607 having been entered hitherto; a message 608 indicative of no matching in the combinations; and a close key 609. For example, when the input password matches the registered password ("hoge@@@@1234"), as illustrated in FIG. 6B, the combination display unit 209 displays the input password that matches the registered password, in a different display form (with an underlined portion) 610 from the other display form (without an underlined portion), among all input passwords 607. As the display form, for example, the combination display unit 209 may display the input password that matches the registered password, by coloring with a different color from the other color. This further prevents the correct password from being known by a third person who peeps at the touch panel other than the user.

Then, when the user selects the close key 609 in the combination-result screen 604, the combination display unit 209 closes this combination-result screen 604, and the data-input accepting unit 204 displays the authentication screen 400 on the touch panel again.

Since the symbolic registered password 601 has already been displayed, it is acceptable that the combination-result screen 604 is not displayed.

Here, the data-input accepting unit 204 prompts the user to enter an input user ID and input password again by displaying the authentication screen 400. That is, when the user additionally enters an input user ID and input password, the data-input accepting unit 204 accepts the input of the user ID and password (FIG. 3: S112). Then, the authentication determination unit 205 resets the failure count ("five times") to the initial value ("zero times"), accepts a new input user ID and input password, and determines whether or not the entered input user ID matches the registered user ID and the entered input password matches the registered password (FIG. 3: S113).

Subsequently, when the input user ID matches the registered user ID and the input password matches the registered password (FIG. 3: YES at S113), the authentication determination unit 205 executes the user authentication (FIG. 3: S104). Especially, since the symbolic registered password 601 and the combination-result screen 604 has been displayed to the user, the user authentication in this case is more likely to succeed.

On the other hand, as a result of the determination, when the entered input user ID does not match the registered user ID, or the entered input password does not match the registered password (FIG. 3: NO at S113), the authentication determination unit 205 counts the failure count by only one from the initial value ("zero times") and determines whether or not this failure count matches the account lock threshold value (FIG. 3: S114). Then, when the failure count does not match the account lock threshold value (FIG. 3: NO at S114), the data-input accepting unit 204 returns to S112 and accepts a new input user ID and input password (FIG. 3: S112). That is, the account lock is initialized again, and the user is provided with an opportunity to enter a new user ID and password as many as the account lock threshold value. Consequently, this ensures prompting a user who wants to enter a user ID and password multiple times to enter the correct user ID and password without imposition of an account lock restriction on the user in a uniform manner.

On the other hand, when the failure count matches the account lock threshold value (FIG. 3: YES at S114), the authentication determination unit 205 performs the account lock, inhibits the input of a new user ID and password from the user (failure of the user authentication), and terminates the process (FIG. 3: S115). Similarly, at S106, as a result of the determination, when neither the first set nor the second set exists (FIG. 3: NO at S106), the partial determination unit 206 notifies the authentication determination unit 205 of the result of the determination, and the authentication determination unit 205, which has received this notice, performs the account lock (FIG. 3: S115). This ensures prevention of unauthorized access by imposition of the account lock restriction ordinarily on a user who did not enter the correct user ID or password at all.

The embodiment of the disclosure is configured to perform the user authentication of an electronic device such as the image processing apparatus 101, with use of the terminal device 100. This ensures that a user does not remain in front of an electronic device for a long time and does not cause trouble to other users. Additionally, the configuration of the embodiment of the disclosure is not limited to the aforementioned configuration, and the operation unit of the image processing apparatus 101 may be configured to incorporate an authentication unit of the terminal device 100. Further, the electronic device is not especially limited and may include an image reading apparatus, an image forming apparatus, an image transmitting device, and similar apparatus other than the image processing apparatus 101.

In the embodiment of the disclosure, the terminal device 100 (authentication apparatus) is configured to include the respective units. However, the following configuration may be acceptable: the programs that ensure these respective units are stored in a storage medium, and that storage medium is provided. This configuration causes respective devices to read the programs, and the respective devices ensure the respective units. In this case, the program itself that is read from the recording medium provides an action and effect of the disclosure. Furthermore, the recording medium may be provided as a method causing the steps that the respective units execute to be stored in a hard disk.

As described above, the authentication apparatus and authentication method according to the disclosure are useful for a terminal device, an image processing apparatus, and similar device. Additionally, the authentication apparatus and authentication method according to the disclosure are effective as the authentication apparatus and authentication method that enable a user to enter the correct user ID and password by entering the user ID and password multiple times, even when the user has forgotten the correct user ID and password.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An authentication apparatus, comprising:
   an authentication determination circuit that determines whether or not an input user ID entered by a user matches a registered user ID, and an input password entered by the user matches a registered password;
   a partial determination circuit that determines whether or not any one of a first set or a second set exists among sets of the input user IDs and the input passwords having been entered hitherto when the entered input user ID does not match the registered user ID or the entered input password does not match the registered password, the first set being a set where only the input user ID matches the registered user ID, the second set being a set where only the input password matches the registered password; and
   a combination determination circuit that generates a new set, when the first set or the second set exists, by combining the input user ID of the existing first set and the input password of another set, or by combining the input password of the existing second set and the input user ID of another set, and determining whether or not the input user ID matches the registered user ID and the input password matches the registered password, among the generated sets; wherein
   the authentication determination circuit executes a user authentication if, among the generated sets, the input user ID matches the registered user ID, and the input password matches the registered password.

2. The authentication apparatus according to claim 1, further comprising:
   a hint display circuit that displays a character type composing the corresponding registered user ID or the registered password by each character in an entry field of an unmatched input user ID or input password in an authentication screen with the matched input user ID or input password being displayed in an entered state with a mask display when, among the generated sets, the input user ID does not match the registered user ID, or the input password does not match the registered password.

3. The authentication apparatus according to claim 1, further comprising:
   a combination display circuit that displays all the sets of the input user IDs and input password that have been entered hitherto, and also displays the input user ID matching with the registered user ID or the input password matching with the registered password in a different display form from another display form when, among the generated sets, the input user ID does not match the registered user ID, or the input password does not match the registered password.

4. The authentication apparatus according to claim 1, wherein:
   the authentication determination circuit counts a failure count indicative of the number of times of the failure of the user authentication when the entered input user ID does not match the registered user ID or the entered input password does not match the registered password, determines whether or not the failure count matches a predetermined account lock threshold value, and accepts a new input user ID and input password when the failure count does not match the account lock threshold value; and
   the partial determination circuit determines whether or not any one of the first set or the second set exists when the failure count matches the account lock threshold value.

5. The authentication apparatus according to claim 4, wherein the authentication determination circuit accepts a new input user ID and input password by resetting the failure count to an initial value when, among the generated sets, the input user ID does not match the registered user ID or the input password does not match the registered password.

6. The authentication apparatus according to claim 1, wherein the authentication apparatus is communicatively connected to an electronic device and executes an user authentication with use of data for authentication of the electronic device instead of the electronic device.

7. An authentication method, comprising:

determining whether or not an input user ID entered by a user matches a registered user ID, and an input password entered by the user matches a registered password;

determining whether or not any one of a first set or a second set exists among sets of the input user IDs and the input passwords having been entered hitherto when the entered input user ID does not match the registered user ID or the entered input password does not match the registered password, the first set being a set where only the input user ID matches the registered user ID, the second set being a set where only the input password matches the registered password; and generating a new set, when the first set or the second set exists, by combining the input user ID of the existing first set and the input password of another set, or by combining the input password of the existing second set and the input user ID of another set, and determining whether or not the input user ID matches the registered user ID and the input password matches the registered password, among the generated sets; wherein the determination of the input user ID and input password executes a user authentication if, among the generated sets, the input user ID matches the registered user ID, and the input password matches the registered password.

8. A non-transitory computer-readable recording medium storing an authentication program for controlling an authentication apparatus, the authentication program causing the authentication apparatus to function as:

an authentication determination circuit that determines whether or not an input user ID entered by a user matches a registered user ID, and an input password entered by the user matches a registered password;

a partial determination circuit that determines whether or not any one of a first set or a second set exists among sets of the input user IDs and the input passwords having been entered hitherto when the entered input user ID does not match the registered user ID or the entered input password does not match the registered password, the first set being a set where only the input user ID matches the registered user ID, the second set being a set where only the input password matches the registered password; and a combination determination circuit that generates a new set, when the first set or the second set exists, by combining the input user ID of the existing first set and the input password of another set, or by combining the input password of the existing second set and the input user ID of another set, and determining whether or not the input user ID matches the registered user ID and the input password matches the registered password, among the generated sets; wherein the authentication determination circuit executes a user authentication if, among the generated sets, the input user ID matches the registered user ID, and the input password matches the registered password.

* * * * *